(12) United States Patent
Shin et al.

(10) Patent No.: US 11,243,129 B2
(45) Date of Patent: Feb. 8, 2022

(54) METHOD AND APPARATUS FOR ANALYZING A COLLISION IN AN ELECTRONIC DEVICE

(71) Applicant: Samsung Electronics Co., Ltd., Gyeonggi-do (KR)

(72) Inventors: Jaeyoung Shin, Gyeonggi-do (KR); Jungsik Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 588 days.

(21) Appl. No.: 16/110,769

(22) Filed: Aug. 23, 2018

(65) Prior Publication Data
US 2019/0064017 A1 Feb. 28, 2019

(30) Foreign Application Priority Data

Aug. 29, 2017 (KR) ........................ 10-2017-0109685

(51) Int. Cl.
*G01L 5/00* (2006.01)
*H04W 4/38* (2018.01)
*H04M 1/72454* (2021.01)

(52) U.S. Cl.
CPC ........ *G01L 5/0052* (2013.01); *H04M 1/72454* (2021.01); *H04W 4/38* (2018.02)

(58) Field of Classification Search
None
See application file for complete search history.

(56) References Cited

U.S. PATENT DOCUMENTS

| 6,429,789 | B1 * | 8/2002 | Kiridena ................... B60R 1/00 |
| | | | 340/905 |
| 6,561,301 | B1 * | 5/2003 | Hattori ............... B60R 21/0136 |
| | | | 180/274 |
| 8,996,767 | B2 | 3/2015 | Eaton et al. |
| 9,342,108 | B2 * | 5/2016 | Rothkopf .............. G06F 1/1694 |
| 10,424,204 | B1 * | 9/2019 | Han ........................ B60Q 1/48 |
| 2006/0236761 | A1 | 10/2006 | Inoue et al. |
| 2008/0204218 | A1 * | 8/2008 | Tupman ................ G11B 27/36 |
| | | | 340/501 |
| 2008/0316008 | A1 * | 12/2008 | Takafuji .............. B60R 21/0136 |
| | | | 340/436 |

(Continued)

FOREIGN PATENT DOCUMENTS

| KR | 2006-0111368 | 10/2006 |
| KR | 2013-0030523 | 3/2013 |

(Continued)

*Primary Examiner* — Arleen M Vazquez
*Assistant Examiner* — Brandon J Becker
(74) *Attorney, Agent, or Firm* — The Farrell Law Firm, P.C.

(57) ABSTRACT

An electronic device includes at least one sensor configured to collect sensing data, a memory configured to store the sensing data, and a processor. The processor is configured to acquire first sensing data through the at least one sensor and determine a falling pattern of the electronic device based on the first sensing data, acquire second sensing data through the at least one sensor and determine a collision pattern according to falling of the electronic device based on the second sensing data, determine the type of object with which the electronic device collides based on the falling pattern and the collision pattern, and perform a preset function based on the type of the object.

20 Claims, 13 Drawing Sheets

(56) References Cited

U.S. PATENT DOCUMENTS

| | | | | |
|---|---|---|---|---|
| 2012/0029814 A1* | 2/2012 | Mase | ............... | B60R 19/18 |
| | | | | 701/301 |
| 2012/0223833 A1* | 9/2012 | Thomas | ............ | G16H 50/30 |
| | | | | 340/539.12 |
| 2013/0060489 A1* | 3/2013 | Crossman | ........... | G01L 25/00 |
| | | | | 702/41 |
| 2014/0361883 A1* | 12/2014 | Ryan | ................ | B65G 1/02 |
| | | | | 340/436 |
| 2015/0161836 A1* | 6/2015 | Park | ............... | B60R 25/2045 |
| | | | | 340/5.51 |
| 2015/0230534 A1* | 8/2015 | McGuckin, Jr. | ...... | G01L 5/0052 |
| | | | | 2/411 |
| 2015/0377694 A1* | 12/2015 | Shepard, Jr. | ......... | G01L 5/0052 |
| | | | | 73/658 |
| 2016/0332706 A1* | 11/2016 | Martens | .............. | B63B 32/57 |
| 2018/0020091 A1* | 1/2018 | Self | ................. | H04M 1/72424 |
| 2018/0120174 A1* | 5/2018 | Meetin | ............... | G01L 1/247 |

FOREIGN PATENT DOCUMENTS

KR   2014-0108896   9/2014
KR   2016-0090554   8/2016

\* cited by examiner

METHOD AND APPARATUS FOR ANALYZING A COLLISION IN AN ELECTRONIC DEVICE

CROSS-REFERENCE TO RELATED APPLICATION(S)

This application is based on and claims priority under 35 U.S.C. § 119 to Korean Patent Application No. 10-2017-0109685, filed on Aug. 29, 2017, in the Korean Intellectual Property Office, the disclosure of which is incorporated by reference herein in its entirety.

BACKGROUND

1. Field

The present disclosure relates generally to a method and an apparatus for analyzing a collision of an electronic device.

2. Description of Related Art

An electronic device may perform various functions in a complicated manner. For example, mobile communication terminals, personal digital assistants (PDAs), electronic organizers, smart phones, and tablet personal computers (PCs) have been developed to provide additional convenience to users while implementing advanced functions.

The electronic device may use sensors to provide various functions. For example, the electronic device may detect a motion of the electronic device through an acceleration sensor or a gyro sensor. The electronic device may collect information through various sensors and provide various services to users.

A user may subject an electronic device to impact, either by mistake or on purpose. For example, the user may drop the electronic device by mistake while carrying or using the electronic device, or may subject the electronic device to impact by throwing the electronic device in order to break the electronic device on purpose.

It may be advantageous for the electronic device to be able to detect a collision through a sensor therein, analyze the impact applied to the electronic device by the collision, and provide appropriate information to the user or the manufacturer of the electronic device.

SUMMARY

The present disclosure has been made to address the above-mentioned problems and disadvantages, and to provide at least the advantages described below.

In accordance with an aspect of the present disclosure, an electronic device is provided that includes at least one sensor configured to collect sensing data; a memory configured to store the sensing data; and a processor configured to acquire first sensing data through the at least one sensor and determine a falling pattern of the electronic device based on the first sensing data, acquire second sensing data through the at least one sensor and determine a collision pattern according to falling of the electronic device based on the second sensing data, determine the type of object with which the electronic device collides based on the falling pattern and the collision pattern, and perform a preset function based on the type of the object.

In accordance with another aspect of the present disclosure, an electronic device is provided that includes at least one sensor configured to collect sensing data; and a processor, wherein the processor is configured to acquire sensing data corresponding to falling of the electronic device through the at least one sensor, detect whether the electronic device collides with an external object based on the acquired sensing data, and when a collision is detected, determine the type of the object based on the acquired sensing data and perform a preset function according to the type of the object.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
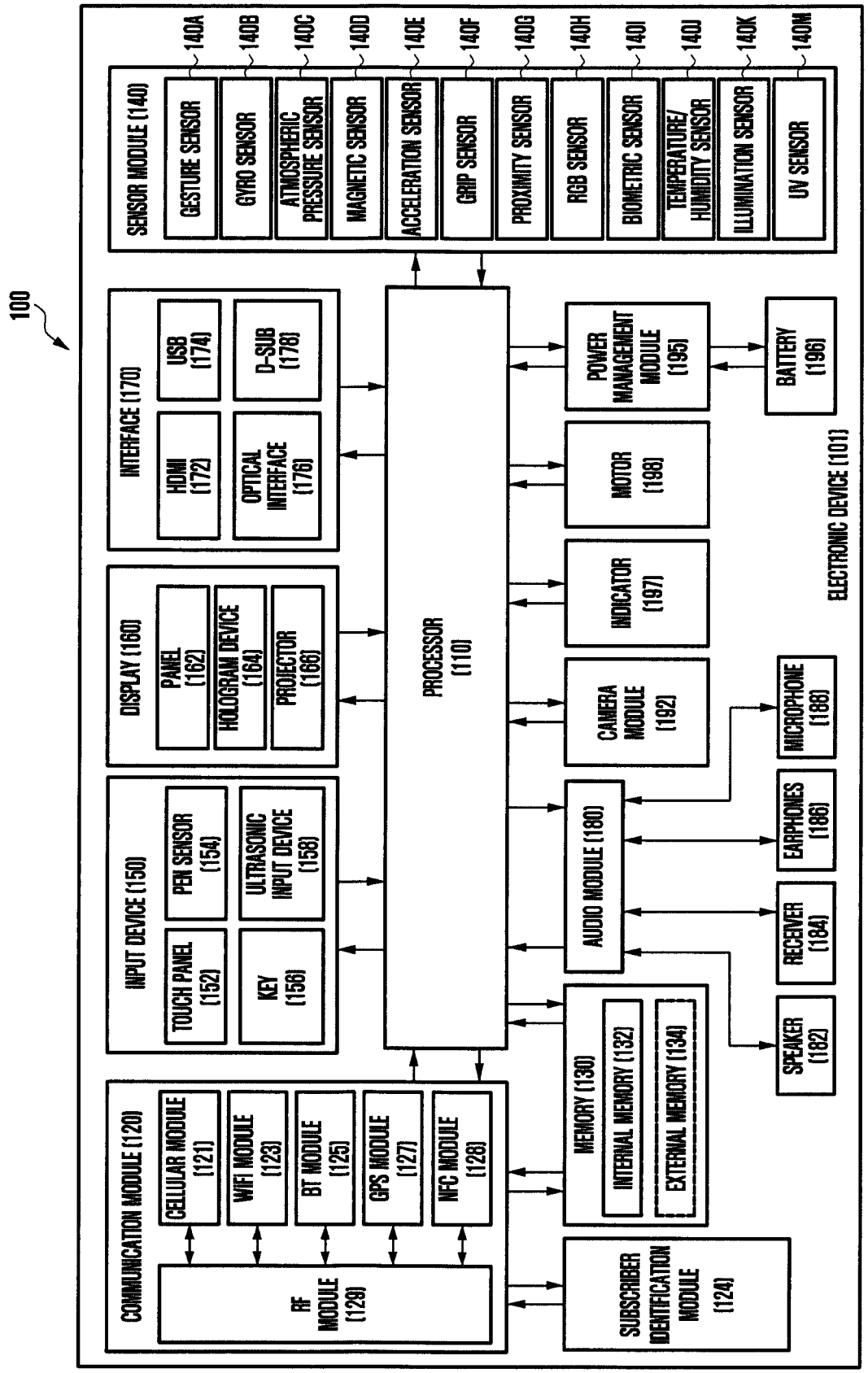
FIG. 1 is a block diagram of an electronic device, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, singular terms such as "a," "an," and "the" may include the plural forms thereof unless the context clearly indicates otherwise. Thus, for example, reference to "a component surface" may include reference to one or more of such surfaces.

As used herein, the expressions "A or B", "at least one of A and B", "at least one of A or B", "one or more of A and B", and "one or more of A or B" may include any and all combinations of one or more of the associated listed items. Terms such as "A or B", "at least one of A and B", or "at least one of A or B" may refer any and all of the cases where at least one A is included, where at least one B is included, or where both of at least one A and at least one B are included.

Expressions including ordinal numbers, such as "first" and "second", may refer to corresponding components without implying an order of importance, and are merely used to distinguish each component from the others without unduly limiting the components.

It is to be understood that when an element (e.g., a first element) is referred to as being "operatively" or "communicatively" "coupled with", "coupled to", "connected with" or "connected to" another element (e.g., a second element), the element can be directly coupled with/to another element or coupled with/to another element via an intervening element (e.g., a third element). In contrast, when an element (e.g., a first element) is referred to as being "directly coupled with", "directly coupled to", "directly connected with" or "directly connected to" another element (e.g., a second element), it should be understood that there is no intervening element (e.g., a third element).

As used herein, the expressions "configured to" or "set to" may be interchangeably used with the expressions "suitable for", "having the capacity to", "designed to", "adapted to", "made to", or "capable of". The expressions "configured to" or "set to" should not be construed to only mean "specifically designed to" in hardware. Instead, the expression "a device configured to" may mean that the device is "capable of" operating together with another device or other components. For example, a "processor configured to perform A, B, and C" or a processor set to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

According to an embodiment of the present disclosure, an electronic device may include at least one of a smart phone, a tablet PC, a mobile phone, a video phone, an e-book reader, a desktop PC, a laptop PC, a netbook computer, a workstation, a server, a PDA, a portable multimedia player (PMP), a Moving Picture Experts Group phase 1 or phase 2 (MPEG-1 or MPEG-2) audio layer 3 (MP3) player, a medical device, a camera, and a wearable device. A wearable device may include at least one of an accessory type device (e.g., a watch, a ring, a bracelet, an anklet, a necklace, an electronic accessory, eyeglasses, contact lenses, or a head-mounted device (HMD)), a textile or cloth assembled type device (e.g., electronic clothing), a body attached type device (e.g., a skin pad or tattoo), or a body transplant circuit. An electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

According to an embodiment of the present disclosure, an electronic device may include at least one of various medical devices (e.g., magnetic resonance angiography (MRA) devices, magnetic resonance imaging (MRI) devices, computed tomography (CT) devices, a scanning machine, or an ultrasonic wave device), a navigation device, a global navigation satellite system (GNSS), an event data recorder (EDR), a flight data recorder (FDR), a vehicle infotainment device, electronic equipment for a ship (e.g., navigation equipment for a ship or a gyrocompass), avionics, a security device, a head unit for a vehicle, an industrial or home robot, a drone, an automated teller machine (ATM), a point of sales (POS) device, and various Internet of things (IoT) devices (e.g., light bulbs, various sensors, electric or gas meters, sprinkler devices, fire alarms, thermostats, street lamps, toasters, exercise equipment, hot water tanks, heaters, and boilers).

Additionally, an electronic device may include at least one of a part of furniture or buildings/structures, electronic boards, electronic signature receiving devices, projectors, or various measuring instruments (e.g., water meters, electricity meters, gas meters, or wave meters).

According to an embodiment of the present disclosure, an electronic device may be flexible or a combination of two or more of the aforementioned devices.

As used herein, the term "user" may refer to a person who uses an electronic device, or a machine (e.g., an artificial intelligence device) which uses an electronic device. The term "module" may refer to, for example, a unit including one or more combinations of hardware, software, and firmware. The term "module" may be interchangeable used with a term such as "unit," "logic," "logical block," "component," or "circuit". The "module" may be an integrated component or a part thereof for performing one or more functions. The "module" may be implemented mechanically or electronically. For example, the "module" may include at least one of an application-specific integrated circuit (ASIC) chip, a field-programmable gate array (FPGA), and a programmable-logic device for performing certain operations which have been known or are to be developed in the future.

The computer readable recording medium may include magnetic media such as a hard disk, a floppy disk and a magnetic tape. Additionally, the computer readable recording medium may include optical media such as a compact disc read only memory (CD-ROM) and a digital versatile disc (DVD), or magneto-optical media such as a floptical disk. Further, the computer readable recording medium may include a hardware device specially configured to store and execute a program command, such as a read only memory (ROM), a random access memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Modules or programming modules according to the present disclosure may include one or more of the aforementioned components or may further include other additional components, or some of the aforementioned components may be omitted. Operations executed by a module, a programming module, or other component elements may be executed sequentially, in parallel, repeatedly, or in a heuristic manner. Furthermore, some operations may be executed in a different order or may be omitted, or other operations may be added.

FIG. 1 is a block diagram illustrating an electronic device 100, according to an embodiment.

Referring to FIG. 1, the electronic device 100 may include at least one processor (e.g., an AP) 110, a communication module 120, a subscriber identification module (SIM) card 124, a memory 130, a sensor module 140, an input unit or input device 150, a display or display module 160, an interface 170, an audio module 180, a camera module 191, a power management module 195, a battery 196, an indicator 197, and a motor 198.

The processor 110 is capable of executing, for example, an operating system (OS) or an application program to control a plurality of hardware or software components connected to the processor 110, processing data, and performing operations. The processor 110 may be implemented as, for example, a system on chip (SoC). According to an embodiment, the processor 110 may further include a graphics processing unit (GPU) and/or an image signal processor.

The processor 110 may also include at least some of the components shown in FIG. 1 (e.g., the cellular module 121). The processor 110 is capable of loading commands or data received from at least one other component (e.g., a non-volatile memory) on a volatile memory, and is capable of processing the loaded commands or data. The processor 110 is capable of storing data in the non-volatile memory (e.g. memory 130). The communication module 120 may perform data communication with any other electronic device connected to the electronic device 100 through the network.

The communication module 120 may include a cellular module 121, a wireless fidelity (Wi-Fi) module 123, a bluetooth (BT) module 125, a GNSS module or global positioning system (GPS) module 127, a near field communication (NFC) module 128, and a radio frequency (RF) module 129. The cellular module 121 is capable of providing voice calls, video calls, short message service (SMS), or Internet service through a communication network.

The cellular module 121 is capable of identifying and authenticating the electronic device 100 in a communication network by using the SIM 124 (e.g., a SIM card). According to an embodiment, the cellular module 121 is capable of performing at least some of the functions provided by the processor 110. The cellular module 121 may include a communication processor (CP). The processor 110 may include a microprocessor or any suitable type of processing circuitry, such as one or more general-purpose processors (e.g., advanced reduced instruction set computing (RISC) machine (ARM)-based processors), a digital signal processor (DSP), a programmable logic device (PLD), an application-specific integrated circuit (ASIC), a field-programmable gate array (FPGA), a GPU, or a video card controller.

Additionally, when a general purpose computer accesses instructions for implementing the processing described herein, execution of the instructions may cause the general purpose computer to transform into a special purpose computer for executing the processing described herein. The functions and steps provided in the figures may be implemented in hardware, software or a combination of both, and may be performed in whole or in part according to the programmed instructions of a computer. In addition, it will be understood that a "processor" or "microprocessor" may be hardware in the claimed disclosure.

The Wi-Fi module 123, the BT module 125, the GNSS module 127, and the NFC module 128 may each include a processor for processing data transmitted or received through the corresponding module.

According to an embodiment, at least part of the cellular module 121, Wi-Fi module 123, BT module 125, GNSS module 127, and NFC module 128 (e.g., two or more modules) may be included in one integrated chip (IC) or one IC package. The RF module 129 is capable of transmission/reception of communication signals (e.g., RF signals). The RF module 129 may include a transceiver, a power amp module (PAM), a frequency filter, a low noise amplifier (LNA), or an antenna. At least one of the cellular module 121, the Wi-Fi module 123, the BT module 125, the GNSS module 127, and the NFC module 128 is capable of transmission/reception of RF signals through a separate RF module. The SIM module 124 may include a SIM card or an embedded SIM. The SIM module 124 may also contain unique identification information (e.g., an integrated circuit card identifier (ICCID), or subscriber information such as an international mobile subscriber identity (IMSI)).

As illustrated in FIG. 1, memory 130 may include a built-in or an internal memory 132 and/or an external memory 134. The built-in or internal memory 132 may be at least one of a volatile memory, (e.g., a dynamic random access memory (DRAM), a static RAM (SRAM), or a synchronous dynamic RAM (SDRAM)), a non-volatile memory, (e.g., a one-time programmable read only memory (OTPROM), a programmable ROM (PROM), an erasable and programmable ROM (EPROM), an electrically erasable and programmable ROM (EEPROM), a mask ROM, a flash ROM, or a flash memory, such as a NAND flash memory or a NOR), a hard drive, or a solid state drive (SSD).

The sensor module 140 is capable of measuring/detecting various physical attributes or operation states of the electronic device 100, and is capable of converting the measured or detected information into electronic signals. The sensor module 140 may be at least one of a gesture sensor 140A, a gyro sensor 140B, an atmospheric pressure or barometer sensor 140C, a magnetic sensor 140D, an acceleration sensor 140E, a grip sensor 140F, a proximity sensor 140G, a color sensor 140H (e.g., a red, green and blue (RGB) sensor), a biometric sensor 140I, a temperature/humidity sensor 140J, an illuminance sensor 140K, and an ultraviolet (UV) sensor 140M.

Additionally or alternatively, the sensor module 140 may further include one or more of an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 140 may further include a control circuit for controlling one or more sensors included therein.

According to an embodiment of the present disclosure, the electronic device 100 may include a processor configured as part of the processor 110, or as a separate component, for controlling the sensor module 140. In this case, while the processor 110 is operating in a sleep mode, the other processor is capable of controlling the sensor module 140. The input device 150 may include a touch panel 152, a pen sensor (e.g., a digital pen or a stylus) 154, a key 156, or an ultrasonic input unit or device 158. The touch panel 152 may be implemented with at least one of a capacitive touch system, a resistive touch system, an IR touch system, and an ultrasonic touch system. The touch panel 152 may further include a control circuit and/or a tactile layer to provide a tactile response or feedback to the user. The pen sensor 154 may be implemented with a part of the touch panel or with a separate recognition sheet. The key 156 may include a physical button, an optical key, or a keypad. The ultrasonic input unit 158 is capable of detecting ultrasonic waves, which may be emitted through a microphone 188, and is capable of identifying signals corresponding to the detected ultrasonic waves.

The display 160 may include a panel 162, a hologram unit or device 164, or a projector 166. The panel 162 may be implemented to be flexible, transparent, or wearable.

The panel 162 may also be incorporated into one module together with the touch panel 152. The hologram unit 164 is capable of producing a stereoscopic image in the air by using light interference. The projector 166 is capable of displaying an image by projecting light onto a screen. The screen may be located inside or outside of the electronic device 100. According to an embodiment, the display 160 may further include a control circuit for controlling the panel 162, the hologram unit 164, or the projector 166.

The interface 170 is capable of including a high definition multimedia interface (HDMI) 172, a universal serial bus (USB) 174, an optical interface 176, or a D-subminiature (D-sub) 178. The interface 170 may be included in the communication interface 107 shown in FIG. 1. Additionally or alternatively, the interface 170 may include a mobile high-definition link (MHL) interface, a secure digital (SD) card/multimedia card (MMC) interface, or an Infrared Data Association (IrDA) standard interface.

The audio module 180, as illustrated in FIG. 1, is capable of providing bidirectional conversion between sounds and electronic signals. At least part of the components in the audio module 180 may be included in the input/output interface 145 shown in FIG. 1. The audio module 180 is also capable of processing sound information input or output through the speaker 182, the receiver 184, the earphones 186, and the microphone 188.

The camera module 191 refers to a device capable of taking both still and moving images. According to an embodiment, the camera module 191 is capable of including one or more image sensors (e.g., a front image sensor or a rear image sensor), a lens, an image signal processor (ISP), and a flash (e.g., a light emitting diode (LED) or xenon lamp), etc.

The power management module 195 is capable of managing power of the electronic device 100. The power management module 195 may include a power management IC (PMIC), a charger IC, or a battery gauge. The PMIC may employ wired charging and/or wireless charging methods. Examples of the wireless charging method include magnetic resonance charging, magnetic induction charging, and electromagnetic charging. To this end, the PIMC may further include an additional circuit for wireless charging, such as a coil loop, a resonance circuit, an induction circuit, or a rectifier. The battery gauge is capable of measuring the residual capacity, charge in voltage, current, or temperature of the battery 196. The battery 196 may be a rechargeable battery.

The indicator 197 is capable of displaying various specific statuses of the electronic device 100 or a part thereof (e.g., the processor 110), such as a boot-up status, a message status, or a charging status. The motor 198 is capable of converting an electrical signal into mechanical vibrations, such as vibration effect or a haptic effect. The electronic device 100 may further include a processing unit (e.g., s GPU) for supporting various mobile TV protocols. The processing unit for supporting mobile TV is capable of processing media data pursuant to various standards, such as digital multimedia broadcasting (DMB), digital video broadcasting (DVB), or MediaFlo™.

Each element described in the present disclosure may be formed with one or more components, and the names of corresponding elements may vary according to the type of the electronic device. In various embodiments, the electronic device may include at least one of the above described elements or may further include other additional elements. Further, some of the elements of the electronic device may be coupled to form a single entity while performing the same functions as before the coupling.

Figure 2:
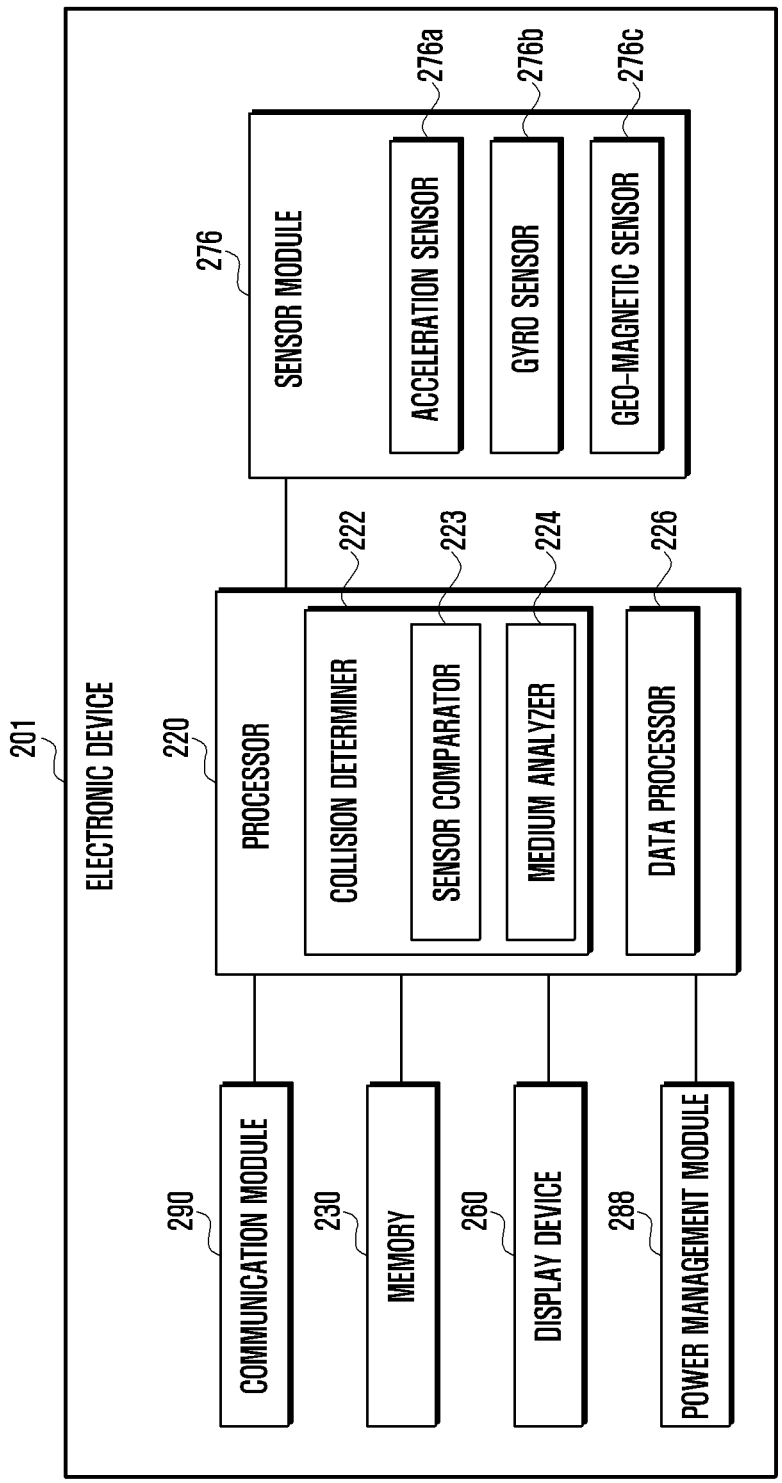
FIG. 2 is a block diagram of the configuration of the electronic device, according to an embodiment.

FIG. 2 is a block diagram illustrating an electronic device 201, according to an embodiment of the present disclosure.

Referring to FIG. 2, the electronic device 201 may include at least one of a processor 220, a memory 230, a display device 260, a sensor module 276, a power management module 288, and a communication module 290.

The electronic device 201 may acquire sensing data through at least one sensor included in the sensor module 276. For example, at least one sensor 276a, 276b, and 276c may acquire sensing data corresponding to falling of the electronic device 201 (i.e., when the electronic device is in a state of falling).

The acceleration sensor 276a may sense information on the magnitude and the direction of a force which the electronic device 201 receives from the outside.

The gyro sensor 276b may sense information on whether a rotary motion is performed and a rotation direction of the electronic device 201.

The geo-magnetic sensor 276c may sense information on a bearing of the electronic device 201 (i.e., an orientation relative to Earth's magnetic field).

The processor 220 may include a collision determiner 222 and a data processor 226.

The electronic device 201 may detect whether the electronic device 201 collides on the basis of sensing data, analyze a collision pattern of the collision, and determine whether the collision matches a pre-stored collision pattern.

For example, the processor 220 may detect whether the electronic device 201 collides on the basis of sensing data acquired from the sensor module 276. Additionally or alternatively, the processor 220 may determine whether the electronic device 201 falls and collides with an external object on the basis of the sensing data from the acceleration sensor 276a. For example, the processor 220 may determine whether the electronic device is falling (or has fallen) and a pattern of the falling on the basis of the sensing data. Further, the processor 220 may determine whether the electronic device collides (or has collided) due to the falling and the pattern of the collision on the basis of the sensing data.

The collision determiner 222 of the processor 220 may determine whether the detected collision is a particular collision that matches a predetermined pattern on the basis of the result of analysis of the sensing data.

For example, the collision determiner 222 of the processor 220 may detect a collision that conforms with a preset reference condition, such as a collision applied to the electronic device 201 with a magnitude of impact that can cause errors in the electronic device 201.

The collision determiner 222 may further include a sensor comparator 223 and a medium analyzer 224.

The sensor comparator 223 may compare at least one of a falling pattern and a collision pattern, determined from the sensing data acquired through at least one sensor 276a, 276b, and 276c, with a pre-stored pattern.

For example, the sensor comparator 223 may provide a determination reference for determining the type of object with which the collision occurs caused by the falling corresponding to the sensing data by comparing the sensing data with the pre-stored pattern.

The medium analyzer 224 may analyze the type of object (i.e., a medium) with which the electronic device 201 collides on the basis of sensing data.

For example, the medium analyzer 224 may analyze the type of object with which the electronic device 201 collides on the basis of at least one of a time during which contact with the collision object is maintained when the electronic device 201 collides and a rebound pattern of the electronic device 201 immediately after the collision.

The medium analyzer 224 may analyze the type of object with which the electronic device 201 collides on the basis of the result of analysis by the sensor comparator 223.

The collision determiner 222 may determine whether the collision is a collision that conforms with the preset reference on the basis of the type of object with which the electronic device 201 collides. For example, the collision determiner 222 may determine whether the collision is a collision that conforms with the preset reference according to the degree of rigidity (hardness) of the object with which the electronic device 201 collides or according to elasticity characteristics of the object.

The data processor 226 may delete sensing data on the collision from the memory 230 or separately store sensing data in the memory 230 as effective collision data on the basis of whether the collision of the electronic device 201 is a collision that conforms with the preset reference (e.g., on the basis of the type of object with which the electronic device 201 collides). According to another embodiment, the data processor 226 may control transmission of the effective collision data to an external device.

The memory 230 may store sensing data acquired from the sensor module 276. For example, when it is determined that the sensing data corresponds to a fall and a collision that conforms to the preset reference, the memory 230 may store the sensing data as effective collision data by the data processor 226.

Figure 3:
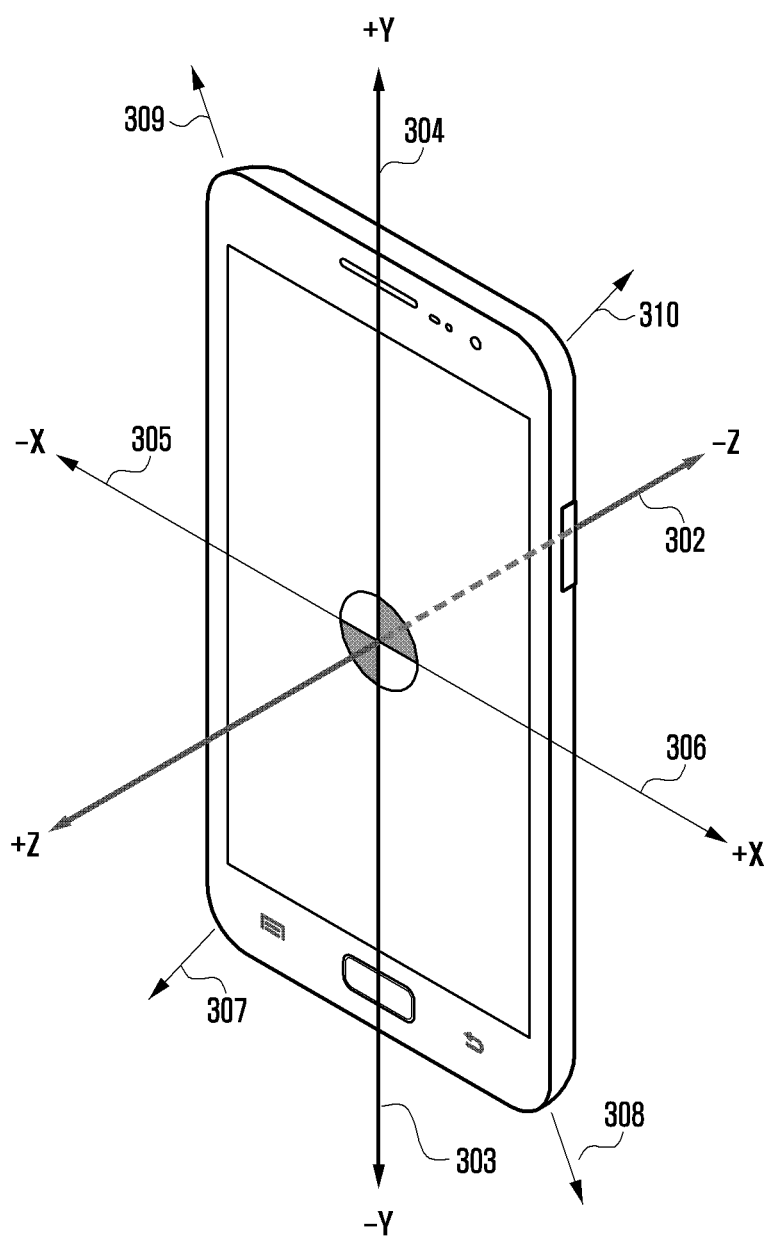
FIG. 3 illustrates a coordinate direction of sensing data in the electronic device, according to an embodiment.

FIG. 3 illustrates a direction of coordinates of sensing data acquired by the electronic device 201, according to an embodiment.

The electronic device 201 may acquire sensing data through at least one of the acceleration sensor 276a, the gyro sensor 276b, and the geo-magnetic sensor 276c. For example, the sensing data acquired by the sensor may include directivity information based on x, y, and z axes, as illustrated in FIG. 3. The x, y, and z axes of the sensing data can be set in any direction as long as they are orthogonal to each other, but each of the x, y, and z axes is oriented to face the electronic device of FIG. 3.

The electronic device 201 may determine the direction in which the electronic device 201 receives an external force or in which the electronic device 201 rotates on the basis of the sensing data.

Table 1 shows acceleration-sensing data which the electronic device 201 acquires at a particular time point according to various embodiments. The reference numerals in Table 1 correspond to the axes directions in FIG. 3.

TABLE 1

| | Acceleration-sensing data | | |
|---|---|---|---|
| Reference numeral | X axis | Y axis | Z axis |
| 301 | 0 | 0 | −9.8 |
| 302 | 0 | 0 | +9.8 |
| 303 | 0 | 9.8 | 0 |
| 304 | 0 | −9.8 | 0 |
| 305 | 9.8 | 0 | 0 |
| 306 | −9.8 | 0 | 0 |
| 307 | 5.21 | 8.15 | 1.85 |
| 308 | −5.54 | 8.16 | 2.52 |
| 309 | 5.59 | −7.68 | 1.82 |
| 310 | −5.96 | −7.82 | 0.52 |

The electronic device 201 determines the position of the electronic device on the basis of acceleration-sensing data at a particular time point.

For example, when values of the x, y, and z axes of the acceleration-sensing data measured by the electronic device 201 have the data values in Table 1, the electronic device 201 may determine that the direction of the reference numeral corresponding to each data value is a position facing the bottom (e.g., in a downward direction).

Such as when sensing data value measured by the acceleration sensor 276a is (+9.8, 0, 0), the electronic device 201 may determine that a left surface (e.g., a surface including a volume key) based on a front surface of the electronic device 201, that is, the x axis direction of FIG. 3, faces the bottom, as indicated by reference numeral 305 of FIG. 3.

In another example, when the acceleration-sensing data value is (0, 0, −9.8), the electronic device 201 may determine that the direction indicated by reference numeral 301 in FIG. 3 faces the bottom. That is, the electronic device 201 may determine that the front surface of the electronic device (e.g., a surface including a display) faces the bottom at the time point at which the acceleration-sensing data is acquired.

The electronic device 201 may determine an initial falling position of the electronic device 201 through acceleration-sensing data at t0. Here, t0 may mean a particular time point after the electronic device 201 starts a motion (e.g. a falling motion) which causes a collision. For example, when the electronic device 201 falls, t0 may mean a particular time point at which it is determined that the electronic device 201 starts falling.

According to an embodiment, the electronic device 201 may predict, through the falling position of the electronic device 201 at t0, the point at which the electronic device 201 is to bump into an object when the electronic device 201 initially collides with the object.

For example, when the acceleration-sensing data value at the time point t0 is (0, 0, +9.8), it may be determined that the electronic device 201 is falling in an orientation such that the back surface of the electronic device 201 faces the bottom. In another example, when the value measured by the acceleration sensor 276a is (−9.8, 0, 0), it may be determined that the electronic device 201 is falling in an orientation such that the right side surface of the electronic device faces the bottom.

In another embodiment, the electronic device 201 may determine the final position of the electronic device 201 through acceleration-sensing data at t3. Here, t3 may mean the time point at which the electronic device stops at a specific position without any rotation and/or rebound motion after collision due to the fall.

Figure 4:
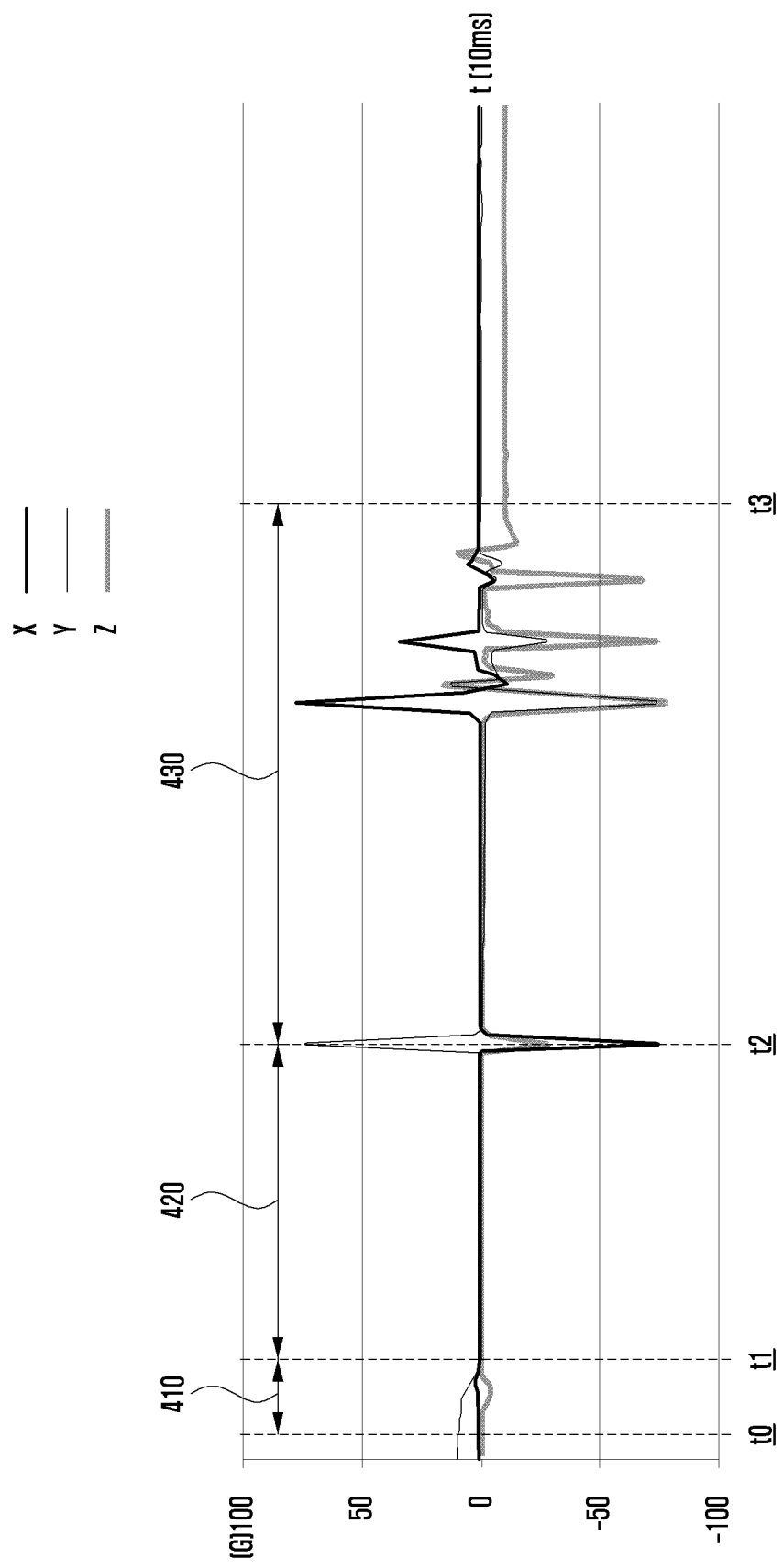
FIG. 4 is a graph illustrating sensing data of the electronic device, according to an embodiment.

FIG. 4 is a graph illustrating sensing data of the electronic device 201, according to an embodiment.

Sensing data, according an embodiment, may be acquired by the acceleration sensor 276a of the electronic device 201.

The electronic device 201 may classify the sensing data acquired by the acceleration sensor 276a into first section data 410, second section data 420, and third section data 430 according to time.

For example, the electronic device 201 may determine t0, t1, t2, and t3 in the sensing data acquired by the acceleration sensor 276a, and determine section data from t0 to t1 as first section data 410, section data from t1 to t2 as second section data 420, and section data from t2 to t3 as third section data 430.

Referring to FIG. 4, t0 may be a particular time point after the electronic device starts a motion which is the cause of the collision. For example, when the electronic device falls, t0 may be a particular time point at which the electronic device starts falling. When the magnitude of acceleration is generated in a particular direction on the basis of the sensing data acquired by the acceleration sensor 276a, the electronic device may determine that the corresponding time point is the time point at which the electronic device starts the motion.

Time t1 may be a time point (e.g., a time point of $a_x^2+a_y^2+a_z^2=0$) at which the magnitude of acceleration in respective axial directions measured by the acceleration sensor 276a all become 0. For example, t1 may be a start time point at which no force is received from the outside. When t0 and t1 are identified in the sensing data acquired by the acceleration sensor, the electronic device 201 may determine that the electronic device 201 is falling or has fallen.

t2 may be the time point at which initial collision occurs. For example, when the electronic device collides by falling, t2 may be the time point at which the electronic device makes contact with the bottom surface.

t3 may be a stabilization time point at which the electronic device stops at a particular position after conducting a rotation and/or a rebound motion according to various patterns after the initial collision of the electronic device.

Figure 5A:
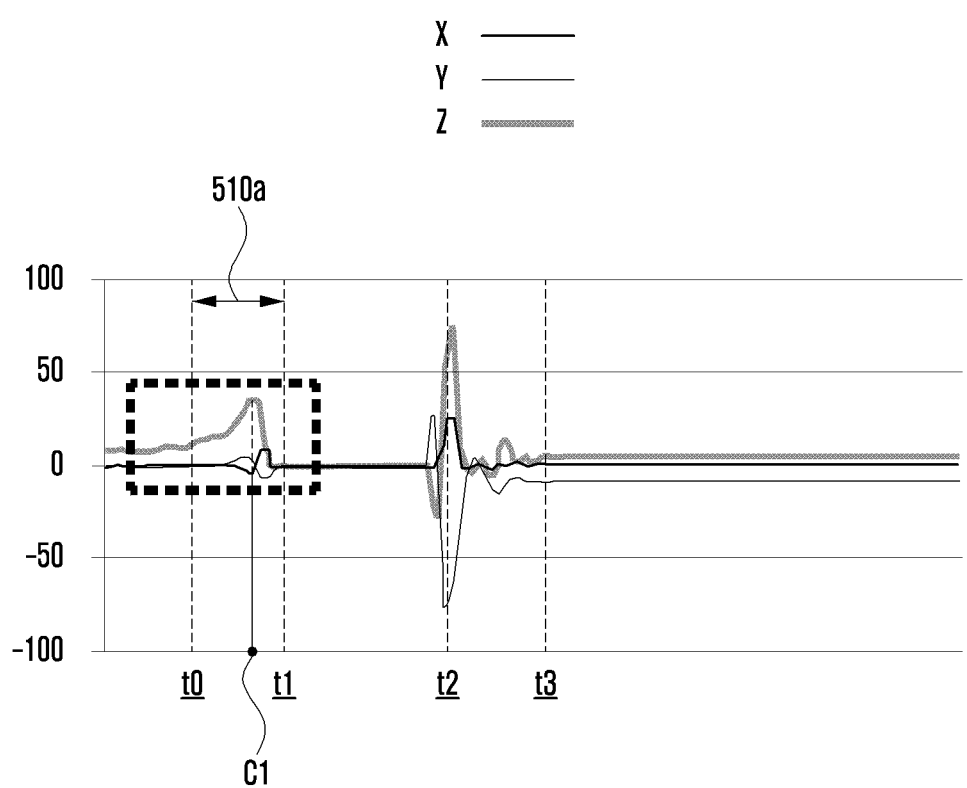
FIGS. 5A to 5C are graphs illustrating sensing data of the electronic device, according to an embodiment.
Figure 5B:
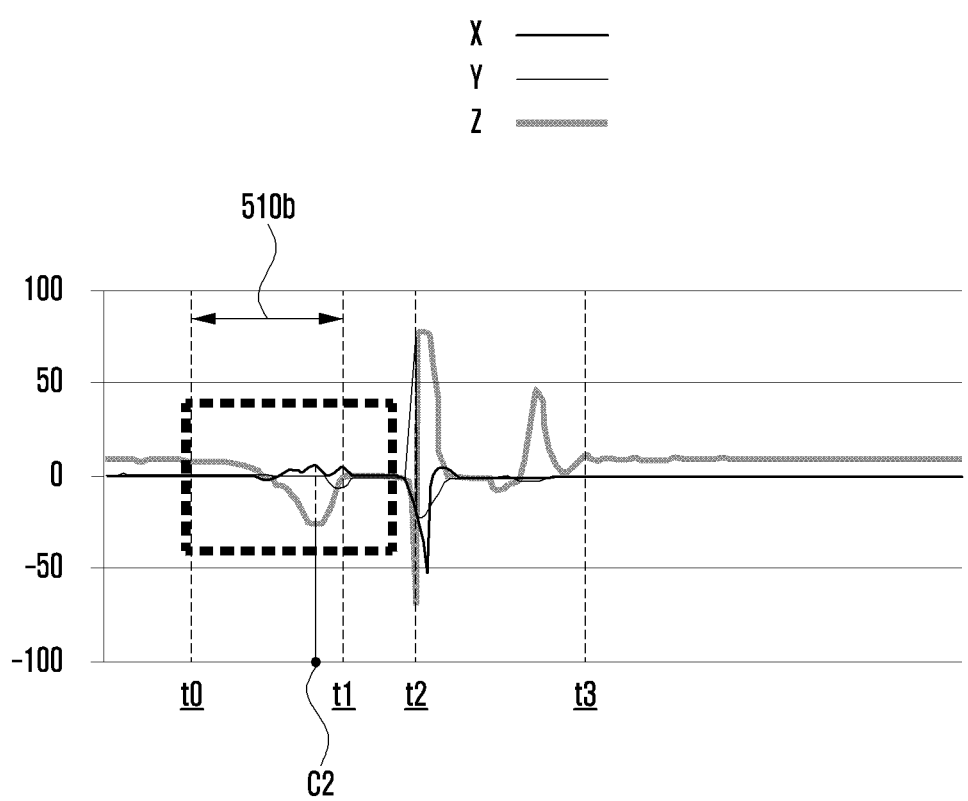
Figure 5C:
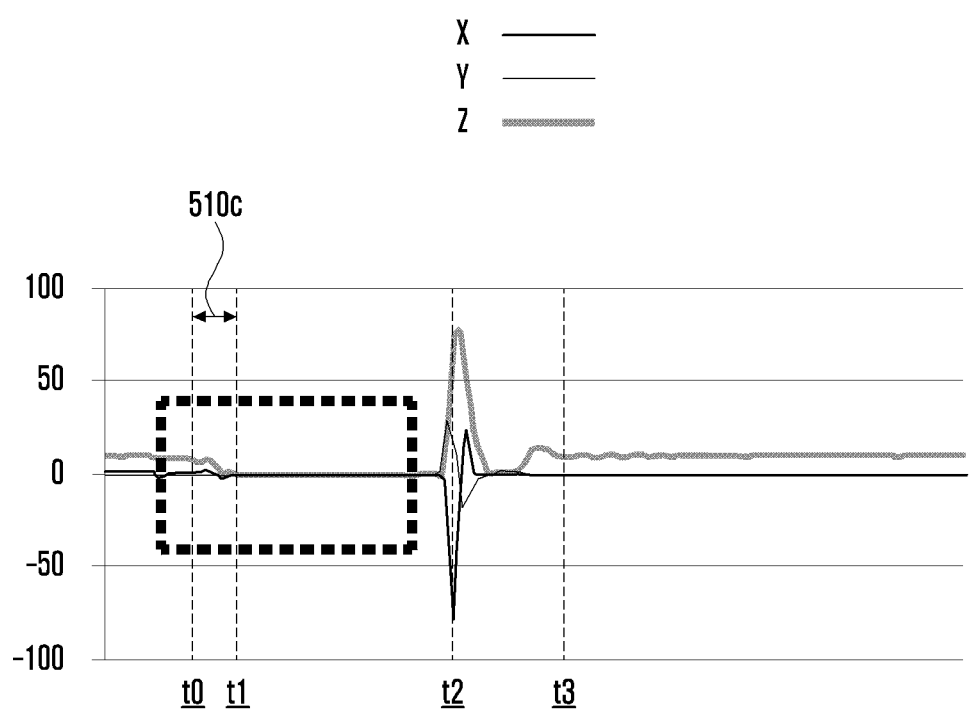

FIGS. 5A to 5C are graphs illustrating sensing data of the electronic device 201, according to various embodiments.

According to an embodiment, the electronic device 201 may extract first section data from sensing data. For example, the first section data in the sensing data may be data in a section (t0 to t1) in which an external force other than gravity is applied to the electronic device.

The electronic device 201 may analyze the first section data. For example, the electronic device 201 may determine a falling pattern of the electronic device 201 on the basis of an analysis result of the first section data. The electronic device 201 may determine at least one characteristic of a motion which is the cause of the collision and a collision point of the electronic device 201 when the electronic device 201 collides due to falling. For example, the electronic device 201 may determine a falling pattern on the basis of a first section data value and assign a weighted value that is used when it is determined whether the collision due to the falling is a collision that conforms with a preset reference on the basis of the fall type inferred based on the falling pattern.

FIG. 5A is a graph illustrating sensing data acquired by the electronic device when the electronic device 201 falls based on a parabolic falling. FIG. 5B is a graph illustrating sensing data when a force is applied in a bottom-surface direction based on a forcible fall of the electronic device 201. FIG. 5C is a graph illustrating sensing data acquired when the electronic device 201 performs a free fall, unlike the case in which the separate force is applied from the outside, such as the parabolic motion or the forcible falling motion.

Referring to FIGS. 5A to 5C, the electronic device 201 may determine a characteristic of the motion corresponding to the cause of the collision of the electronic device 201 through the amplitude of each coordinate direction acceleration of first section data (e.g., sensing data corresponding to the time point from t0 to t1). For example, the electronic device 201 may determine the fall type (indicating the type of fall) of the electronic device 201 on the basis of the first section data. For example, on the basis of the fall type, it may be determined whether the electronic device falls in a parabolic form, the electronic device forcibly falls due to force applied by a user in a particular direction, or the electronic device performs a free fall due to gravity without any other external force being applied thereto.

Additionally or alternatively, when the electronic device collides with an object, the electronic device 201 may determine a collision point of the electronic device contacting the object by analyzing the first section data. For example, the electronic device may determine the collision point of the electronic device based on the magnitude and direction of acceleration in the first section (e.g., the time point from t0 to t1).

Referring to FIG. 5A, the electronic device 201 may identify that the magnitude of a z-axis acceleration value is largest among the x, y and z axes, and that the magnitude of x and y axis acceleration values are close to 0 at t0, so that it may be estimated that the electronic device 201 starts falling such that the rear surface thereof faces the bottom. Further, as the magnitude of the z-axis acceleration value of first section data 510*a* gradually increases and then decreases from a point c1 and gradually approaches 0, it may be estimated that the electronic device 201 receives, from the outside, a force in a direction moving away from the bottom and performs a parabolic motion up to the point c1.

Referring to FIG. 5B, the magnitude of a z-axis acceleration value is a particular value and the magnitude of x and y axis acceleration values are close to 0 at t0, so that it may be estimated that the electronic device 201 according to an embodiment starts falling such that the rear surface thereof faces the bottom.

Referring to first section data 510*b* of FIG. 5B, it can be seen that the z-axis acceleration value has a predetermined magnitude in a +z-axis direction and then the magnitude gradually decreases, and thus the magnitude of a −z-axis direction increases up to a point c2, and then the magnitude decreases again after the point c2 and thus converges on 0. Accordingly, since it may be identified that the electronic device 201 is subject to a force other than gravity (i.e., an external force) in a downward direction from the outside up to the time point c2, it may be estimated that the electronic device 201 is forcibly propelled in a direction toward the bottom by the external force.

Referring to FIG. 5C, like in FIGS. 5A and 5B, it may be estimated that the electronic device starts the falling motion in a direction in which the front surface of the electronic device 201 faces the bottom since there is an acceleration magnitude only in the +z direction at t0. It may also be identified that there is a minimal change in this direction and that the magnitude converges to 0, compared to the magnitude of an initial acceleration in a first section 510*c*. Thus, it may be estimated that a separate external force is not applied to the electronic device 201 in the falling motion.

For example, when it is determined that the electronic device 201 collides after an external force is applied to the electronic device 201, as illustrated in FIG. 5A or 5B, the electronic device may determine that the collision is caused by the user on purpose.

The electronic device 201 may determine the cause of the falling motion on the basis of first section data of the sending data and perform a preset function based on the cause of the falling motion.

For example, when it is determined that the collision of the electronic device 201 is caused by the user on purpose, the electronic device 201 may automatically store at least one of sensing data on the collision and the result of analysis of the sensing data in the electronic device 201 or transmit the same to an external device through a communication module. A manufacturer of the electronic device 201 may use the information for determining whether the collision of the electronic device 201 is caused by the user on purpose.

For example, the electronic device 201 may assign a weighted value, which can be used for determining whether the collision caused by the falling conforms with a preset reference on the basis of the cause of the falling motion, that is, the fall type.

Figure 6A:
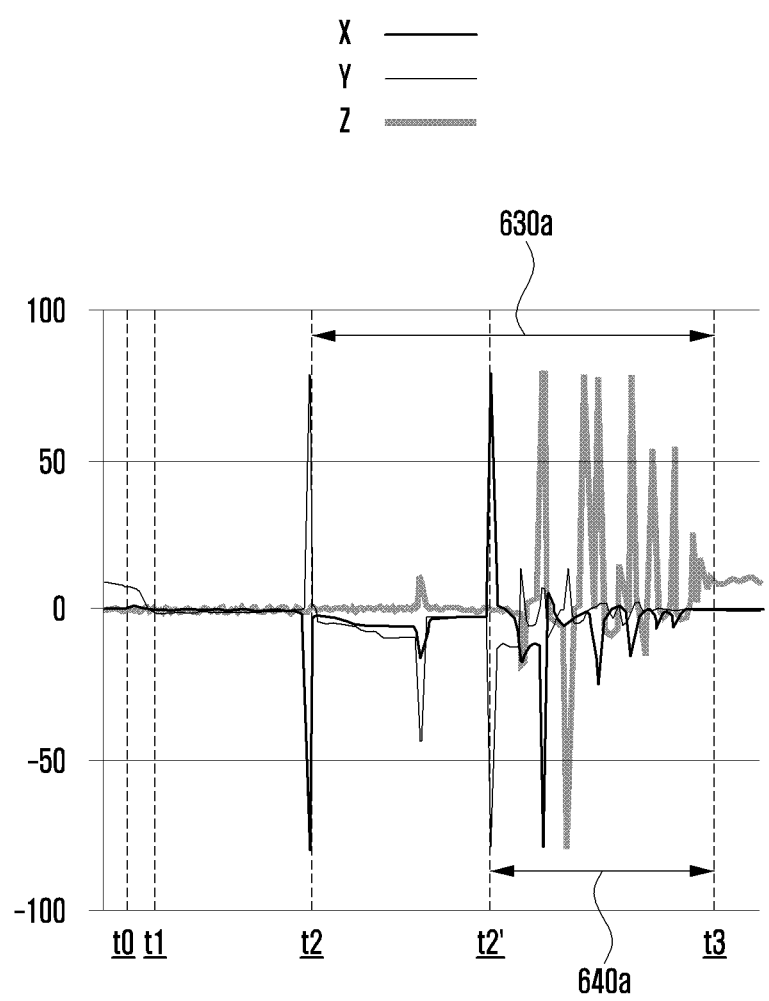
FIGS. 6A to 6C are graphs illustrating sensing data of the electronic device, according to an embodiment.
Figure 6B:
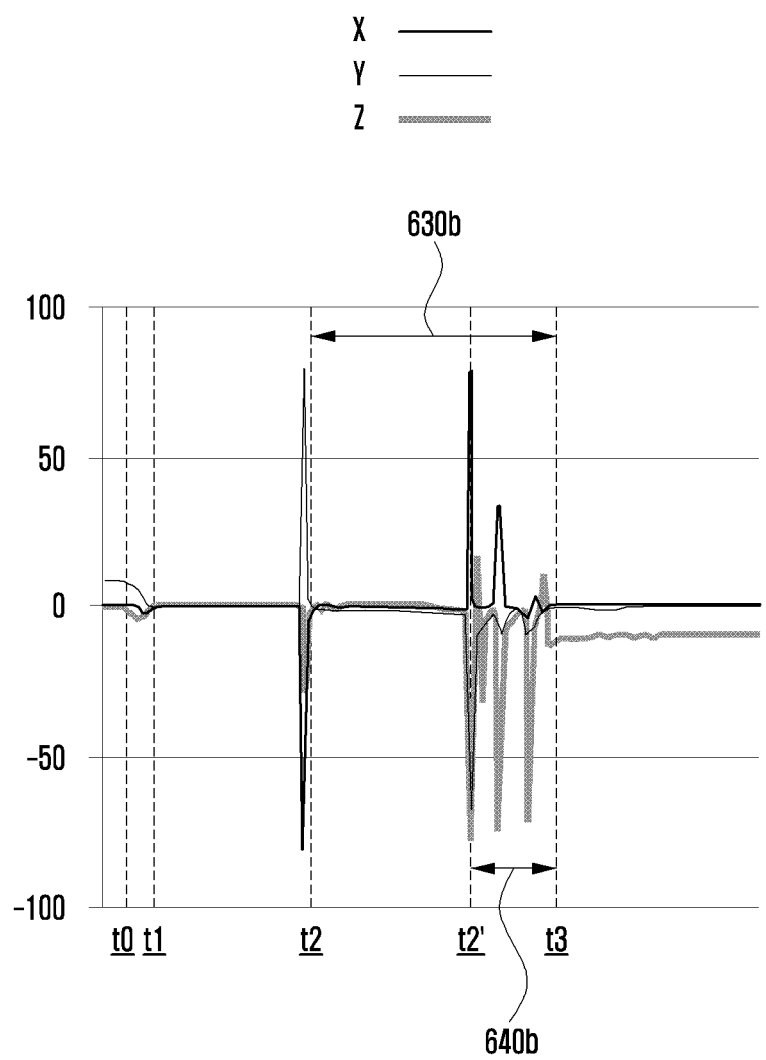
Figure 6C:
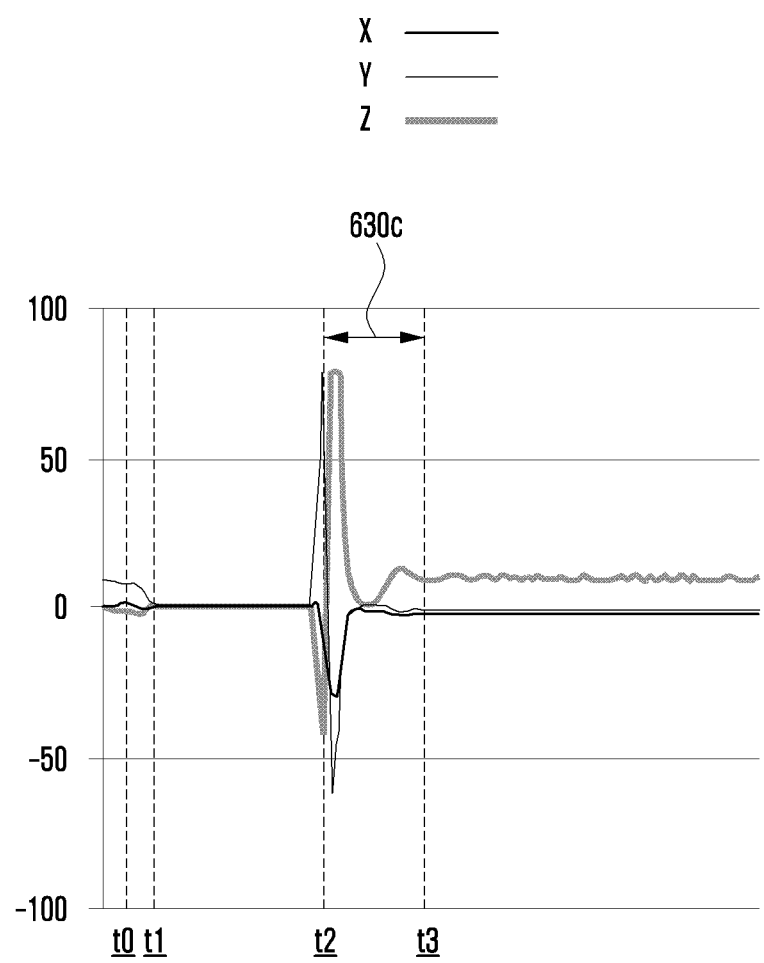

FIGS. 6A to 6C are graphs illustrating acceleration-sensing data of the electronic device 201, according to various embodiments.

The electronic device 201 may determine the medium characteristics of the object with which the electronic device 201 collides on the basis of third section data 630*a*, 630*b*, and 630c acquired from sensing data. For example, the third section data 630a, 630b, and 630c may refer to section data from the time point t2 immediately after the electronic device 201 collides with the object to the time point t3 at which the electronic device 201 stops at a particular position without any rotation and/or rebound motion.

The electronic device 201 may identify the magnitude and direction of the force that the electronic device 201 receives from the outside on the basis of sensing data acquired by the acceleration sensor 276a and identify whether the electronic device 201 performs a rotary motion and a rotation direction of the electronic device 201 on the basis of sensing data acquired by the gyro sensor 276b.

The electronic device 201 may determine a rotation type of the electronic device after the collision of the electronic device 201 on the basis of the acquired sensing data and estimate the medium characteristics of the object with which the electronic device 201 collides.

The electronic device 201 may classify, on the basis of a predetermined reference, a collision pattern generated by the collision of the electronic device 201 according to a degree of rigidity (hardness) of the object with which the electronic device 201 collides or an elasticity characteristic of the object. The electronic device 201 may compare the collision pattern with a collision pattern acquired from the sensing data, and determine the medium characteristics.

For example, when an additional collision is repeated in a section 640a from t2' to t3 due to rebounding after the electronic device 201 initially collides with the object at the time point t2, as illustrated in third section data 630a of FIG. 6A, the electronic device 201 may estimate that the medium of the object is formed of a hard material having high elasticity, such as a concrete surface and the medium has a material characteristic such that it absorbs only a small amount of the impact of the electronic device 201.

When it is determined that the electronic device 201 collides with an object of a hard medium having high elasticity, the electronic device 201 directly absorbs an impact caused by the collision with the object, and an additional impact caused by a secondary collision is subsequently applied to the electronic device 201, so that damage to the electronic device 201 may be predicted.

The electronic device 201, according to various embodiments, may collect sensing data through the gyro sensor and/or the geo-magnetic sensor. For example, the electronic device 201 may determine whether the electronic device 201 performs a rotary motion between the initial time point t2 and the secondary collision time point t2' of the electronic device 201 by analyzing sensing data acquired by the gyro sensor together with sensing data acquired by the acceleration sensor of FIG. 6A.

For example, on the basis of the sensing data acquired by the gyro sensor, it may be estimated that the medium of the object with which the electronic device 201 collides has a hard material characteristic such that it does not absorb impact when the electronic device 201 performs the rotary motion after the initial collision time point t2.

In an embodiment as illustrated in third section data 630b of FIG. 6B, when the rebound pattern 640b from the time point t2' is less than the graph of FIG. 6A, even though a secondary collision of the electronic device 201 occurs at the time point t2', the electronic device 201 may estimate that the electronic device 201 will collide with an object of a medium that is not as hard as the collision object of FIG. 6A. For example, it may be predicted that a magnitude of a second impact will be relatively smaller than the magnitude of a first impact caused by the collision in FIG. 6A.

As illustrated in third section data 630c of FIG. 6C, when there is not a second acceleration magnitude change or pattern of converging to 0 after the first acceleration magnitude of each axis converges to 0 according to the acceleration magnitude change in the third section from t2 to t3 (e.g., when there is no time point t2' in the third section), the electronic device 201 may determine that there is no secondary collision due to rebounding after the initial collision.

When it is identified that there is no secondary collision time point t2' of the electronic device 201 in the third section from t2 to t3, as illustrated in FIG. 6C, it may be estimated that the electronic device 201 collides with a medium of an inelastic material that easily absorbs impact of the electronic device 201 when the electronic device 201 collides therewith. In such a case, the electronic device 201 may determine that the medium of the object is a material such as sponge.

In the case of the collision illustrated in FIG. 6C, the electronic device 201 may predict that a relatively small impact will be applied to the electronic device 201.

Figure 7:
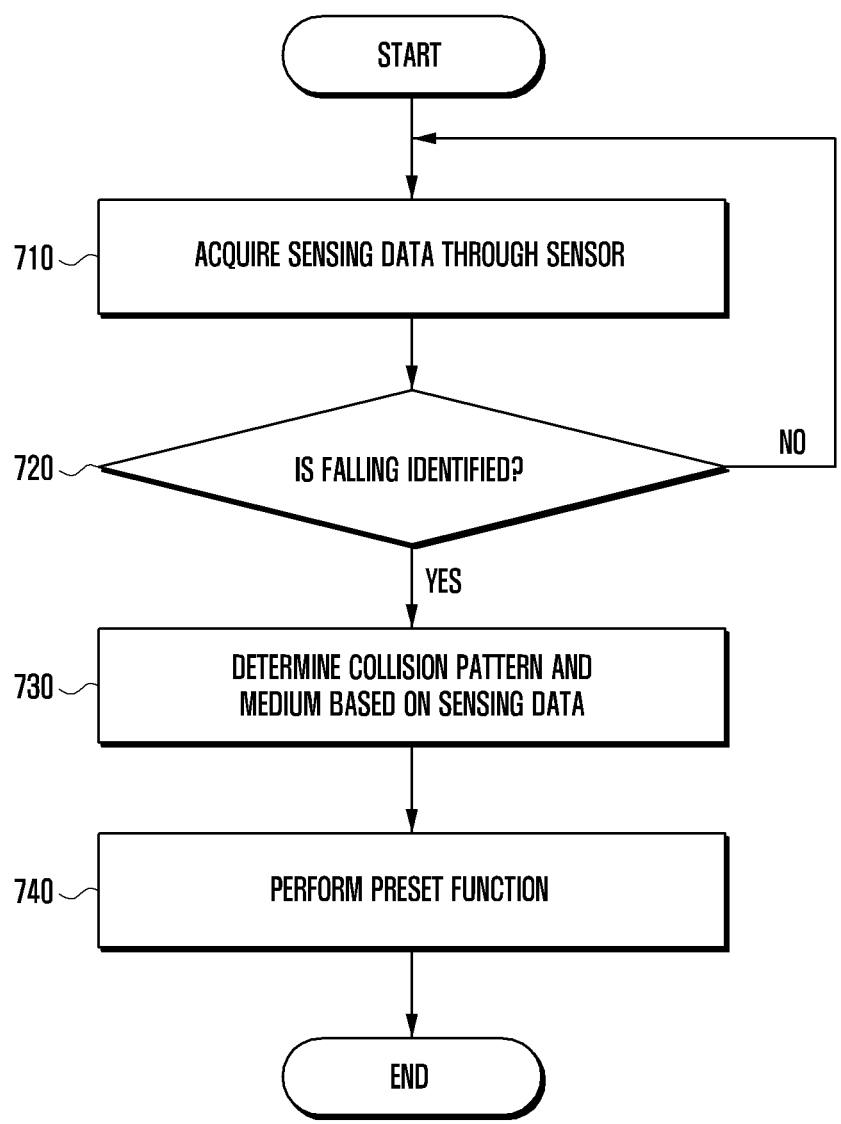
FIG. 7 is a flowchart illustrating a method of performing a function of the electronic device, according to an embodiment.

FIG. 7 is a flowchart illustrating a method of performing a function of the electronic device 201, according to an embodiment.

Referring to FIG. 7, the electronic device 201 may analyze a collision of the electronic device 201 and perform a preset function.

In step 710, the electronic device 201 acquires sensing data through at least one sensor included in the sensor module 276.

In step 720, the electronic device 201 identifies whether the electronic device 201 is falling or has fallen.

For example, when a predetermined pattern is identified from sensing data acquired using the acceleration sensor, the electronic device 201 may determine that the electronic device 201 is falling or has fallen based on the predetermined pattern. The electronic device 201 may determine that the electronic device 201 is falling or has fallen when acceleration magnitudes along three axial directions orthogonal to each other are all 0 for a predetermined time on the basis of the sensing data acquired using the acceleration sensor.

When the electronic device 201 identifies that the electronic device 201 is falling or has fallen, the electronic device determines a collision pattern according to the falling and the medium of the object with which the electronic device 201 collides on the basis of sensing data after the time point of the falling in step 730.

For example, the electronic device 201 may determine the collision pattern and the medium of the collision object through the sensing data after the time point of the falling.

According to an embodiment, the electronic device 201 may classify and extract the sensing data into first section data, second section data, and third section data.

For example, the electronic device 201 may extract sensing data from a time point t0 at which the electronic device 201 starts falling to a time point t1 at which the electronic device 201 starts a free fall as the first section data.

The electronic device 201 may determine a collision pattern on the basis of the first section data and determine at least one of a falling direction, a cause of the falling motion, and an expected point of the collision of the electronic device 201 on the basis of the collision pattern.

In another example, the electronic device 201 may extract sensing data during the time period within which the electronic device 201 performs the free fall as the second section data. The second section data may be sensing data from the time point t1 at which the electronic device 201 starts the free fall to a time point t2 of the collision by the falling.

For example, the second section data may be section data in a section in which the electronic device 201 moves by inertia without receiving any external force. The second section data may be a section in which acceleration magnitudes of respective axes are all 0, that is, $a_x^2 + a_y^2 + a_z^2 = 0$.

The electronic device 201 may analyze a movement distance before the collision of the electronic device 201 on the basis of the second section data.

For example, the electronic device 201 may calculate the movement distance before the collision of the electronic device 201 on the basis of a time t2−t1 of the second section data and an initial movement speed $v_{t0}$ or $v_{t1}$ of the electronic device 201 since there is no external force in the second section data. For example, the electronic device 201 may calculate the initial movement speed of the electronic device through a scheme of integrating an acceleration magnitude from a particular time point at which the electronic device 201 stops to a time point at which the electronic device 201 does not receive any external force other than gravity, and calculate the movement distance before the collision through the initial movement speed and the time of the second section data.

The electronic device 201 may extract sensing data from the time point t2 of the collision caused by the fall to a time point t3 at which the motion caused by the collision stops as the third section data and analyze the collision pattern of the electronic device 201 based on the third section data.

For example, the third section data may be section data (comprising sensing data) up to a time point at which the electronic device 201 stops at a particular position after performing a rotation and/or rebound motion in various patterns after the initial collision with the object.

The electronic device 201 may analyze a time at which the electronic device 201 collides with and contacts the object on the basis of the third section data. Additionally or alternatively, the electronic device 201 may analyze a rebound pattern of the electronic device 201 on the basis of the third section data.

The electronic device 201 may analyze the type (e.g., the medium) of the object with which the electronic device 201 collides on the basis of the third section data. For example, the electronic device 201 may analyze a degree of rigidity of the object or a degree of elasticity of the object on the basis of the third section data.

Subsequently, in step 740, the electronic device 201 performs a preset function based on the collision pattern and the result of the determination of the type of the object with which the electronic device 201 collides in step 730.

For example, when it is determined that the electronic device 201 absorbs a magnitude of impact that is greater than or equal to a predetermined size based on the collision pattern and the result of the determination of the medium, the electronic device 201 may perform control calibration of the electronic device 201.

For example, the electronic device 201 may automatically perform calibration for a camera-focusing function or a hand-shaking prevention function or suggest that the user perform calibration.

Additionally or alternatively, when the electronic device 201 identifies that the electronic device 201 is falling in step 720, the electronic device 201 may drive a protection circuit included in a power management module, stop functions except for minimum functions, or perform an operation of backing up preset data.

For example, the electronic device 201 may display information the collision on the display device 260 based on the collision pattern and the result of the determination of the object type.

Figure 8:
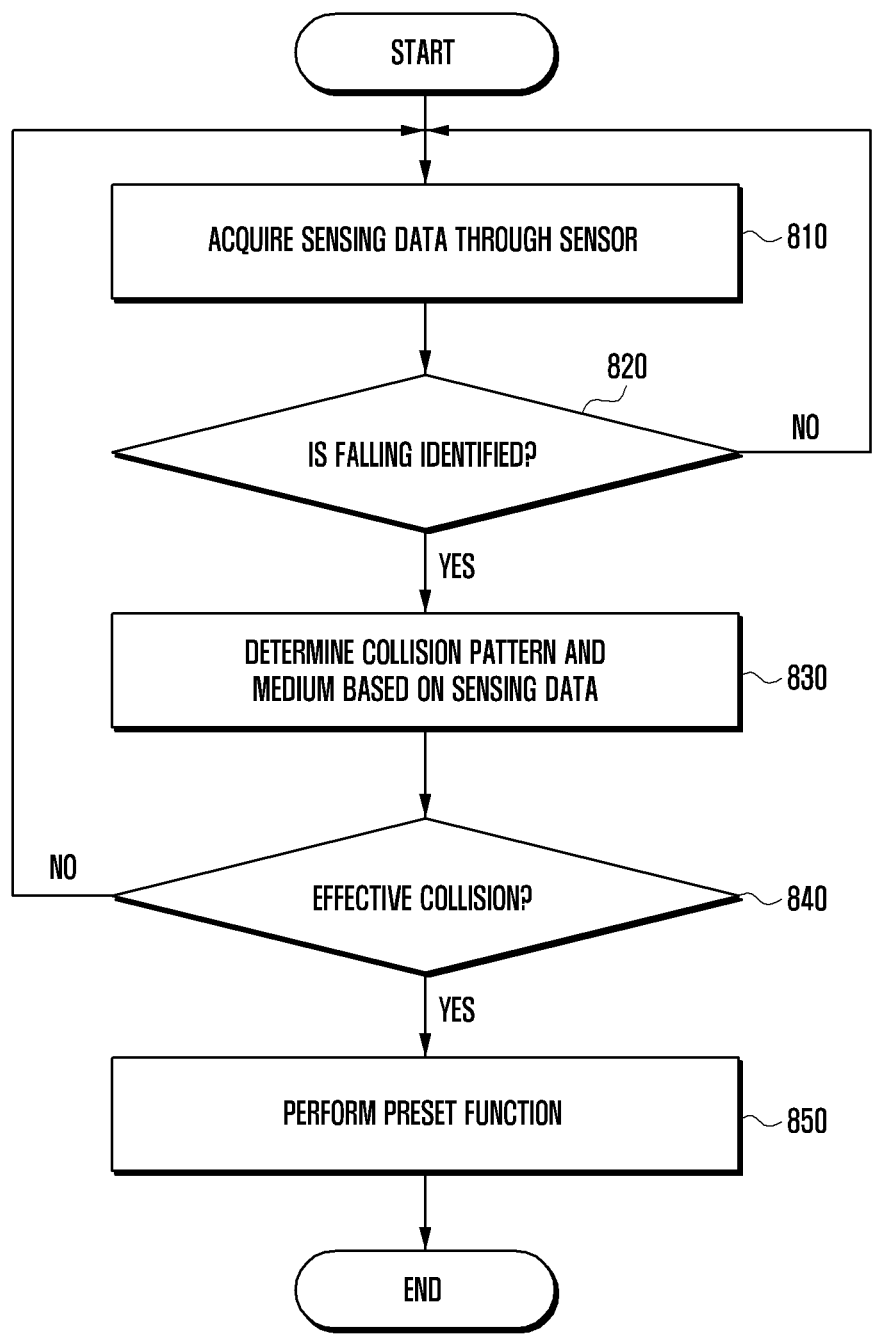
FIG. 8 is a flowchart illustrating a method of determining an effective collision of the electronic device and performing a function, according to an embodiment.

FIG. 8 is a flowchart illustrating a method of determining an effective collision of the electronic device 201 and performing a function, according to an embodiment.

Referring to FIG. 8, the electronic device 201 acquires sensing data of the electronic device 201 through at least one sensor in step 810.

When falling of the electronic device 201 is identified from the sensing data in step 820, the electronic device 201 determines a collision pattern for the collision according to the falling and a medium of the object with which the electronic device 201 collides in step 830.

The electronic device 201 determines whether the collision is an effective collision that conforms with a preset reference condition on the basis of the determined collision pattern and the determined medium of the object in step 840.

For example, the effective collision may be a collision applied to the electronic device 201 with a magnitude of impact that can cause errors in the electronic device 201. The electronic device 201 may assign a weighted value for determining whether the collision is an effective collision on the basis of the result of analysis of the collision pattern.

The effective collision may refer to a reference condition for determining whether to perform a preset collision-related function of the collision applied to the electronic device 201.

The electronic device 201 may determine whether each collision is an effective collision on the basis of the determined collision pattern and information on the medium through sensing data.

The electronic device 201 may identify whether the electronic device 201 collides in a direction in which the collision may cause damage on the basis of the collision pattern acquired from the first section data of the sensing data. When it is determined that a part of the electronic device 201 adjacent to the camera collides with the object, the electronic device 201 may predict that calibration of the camera will be necessary and assign a weighted value of an effective collision to the collision.

According to an embodiment, as the movement distance before the collision of the electronic device 201 increases, the electronic device 201 may predict that the magnitude of impact that the electronic device 201 receives caused by the collision will be larger on the basis of the second section data of the sensing data and assign a weighted value of the effective collision to the collision.

For example, the electronic device 201 may assign a weighted value to the collision according to the degree of rigidity or the degree of elasticity of the medium of the object with which the electronic device 201 collides. When the medium with which the electronic device 201 collides absorbs a minimum amount of impact that the electronic device 201 receives in the collision (i.e., if the medium has characteristics of high rigidity and elasticity), the electronic device 201 may determine that there is a high probability of damage due to the relatively strong impact. Accordingly, when the medium of the collision object is rigid and has high elasticity, the electronic device 201 may assign a weighted value to the collision.

According to an embodiment, the electronic device 201 may assign a greater weighted value if a time during which the electronic device 201 comes into contact with the object due to the collision is shorter, or the electronic device may assign a weighted value according to whether a secondary collision occurs due to rebounding after the primary collision.

The electronic device 201 may assign a weighted value for each element according to the result of analysis of the collision pattern, and when it is determined that the collision conforms to a preset condition, the electronic device 201 may determine that the collision of the electronic device is an effective collision.

When it is determined that the collision applied to the electronic device 201 conforms with the preset reference, the electronic device 201 performs a preset function in step 850.

For example, the electronic device 201 may store sensing data of the collision in the memory 230 as effective collision data. Additionally or alternatively, the effective collision data may include information on the result of analysis of the sensing data.

When it is determined that the collision applied to the electronic device conforms with the preset reference, the electronic device 201 may transmit the sensing data or effective collision data including information on the result of analysis of the sensing data to an external device through the communication module 290.

The effective collision data may include information on whether the collision of the electronic device 201 is caused by the user on purpose. For example, the effective collision data stored in the electronic device 201 or transmitted to the external device may be used for determining the cause of the collision of the electronic device 201.

When it is determined that the collision applied to the electronic device conforms with a preset reference, the electronic device 201 may drive (e.g., enable or activate) a protection circuit. For example, the electronic device 201 may stop software of the electronic device by driving the protection circuit and perform an operation of backing up critical data.

According to an embodiment, when it is determined that the collision applied to the electronic device conforms to the preset reference, the electronic device 201 may display information about the collision to the user through the display device 260.

Figure 9:
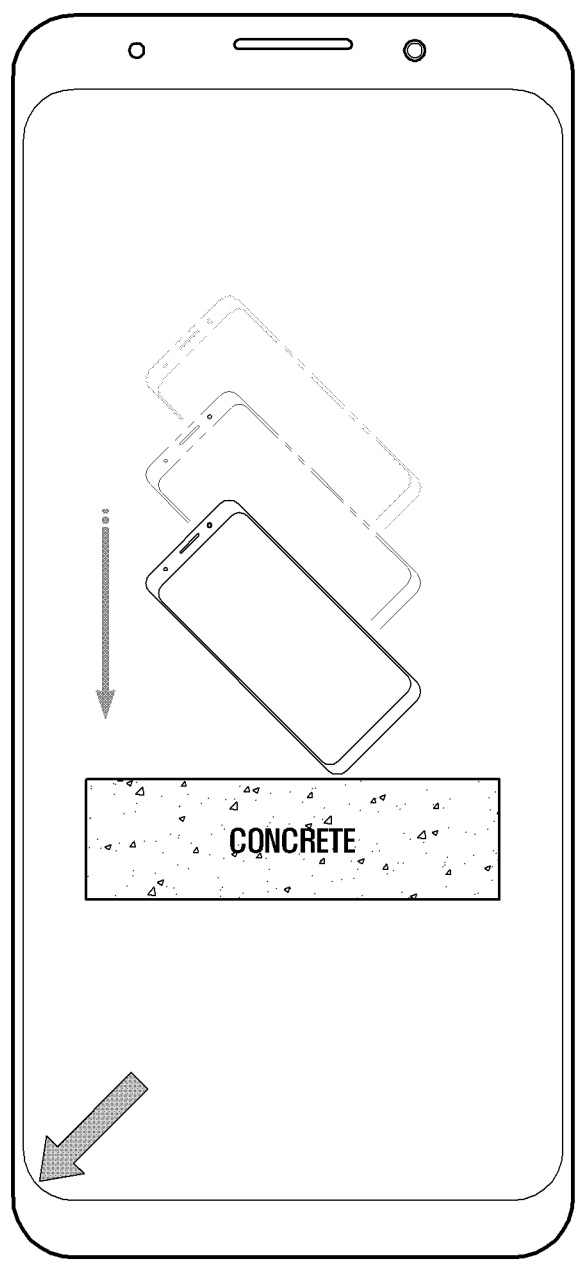
FIG. 9 illustrates a display screen that displays information on a collision of the electronic device, according to an embodiment.

FIG. 9 illustrates a display screen that displays information about the collision in the electronic device 201, according to an embodiment.

The electronic device 201 may display information on the type of the object with which the electronic device 201 collides on the basis of the result of analysis of the sensing data. Additionally or alternatively, the electronic device 201 determines the direction in which the electronic device 201 collides with the object and displays information on a collision point of the electronic device 201 that contacts the object.

As illustrated in FIG. 9, the electronic device may provide a display screen showing that a left lower part of the electronic device collides with a concrete surface.

The electronic device 201 may provide a notification informing the user of backup of data stored in the electronic device 201 or provide a notification informing the user of calibration for a particular function (for example, a hand-shaking prevention function or a camera-focusing function) on the basis of the result of analysis of the collision pattern and/or the object type.

The electronic device 201 may allow the user to easily find the electronic device 201 in a low-light environment by performing turning on a camera LED or the display screen located in a direction facing away from the bottom surface in the state in which the electronic device 201 finally stops after the collision occurs.

The electronic device 201 may indirectly predict impact applied to the electronic device 201 and provide various functions even if the electronic device 201 does not have an acceleration sensor or a collision detection sensor of a high specification that can detect an acceleration magnitude greater than or equal to 100 gravitational acceleration (G).

According to an embodiment, an electronic device can detect a collision of the electronic device and provide an appropriate function to a user.

According to another embodiment, the electronic device can detect a collision applied to the electronic device without an expensive collision detection sensor, which can detect acceleration magnitude larger than or equal to 100 G, and analyze a medium of the object with which the electronic device collides and a collision pattern.

According to another embodiment, when it is determined that a particular collision is applied to the electronic device, the electronic device can minimize damage to the electronic device by providing a notification to the user or by driving a protection circuit.

According to another embodiment, when it is determined that a particular collision is applied to the electronic device, the electronic device can back up data stored in the electronic device or provide calibration for a particular function of the electronic device (i.e., a hand-shaking prevention function or a camera-focusing function).

According to another embodiment, the electronic device can separately store information related to a collision applied to the electronic device or transmit the same to an external device, in order to use the information for determining the cause of breakdown of the electronic device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   at least one sensor configured to acquire sensing data including first sensing data and second sensing data;
   a memory configured to store the sensing data; and
   a processor configured to:
      determine a falling pattern of the electronic device according to a falling of the electronic device based on the first sensing data, wherein the falling pattern indicates a type of fall,
      determine a collision pattern according to a collision between the electronic device and an external object based on the second sensing data,
      determine a characteristic of a medium of the external object based on the collision pattern,
      determine a type of the external object based on the collision pattern and the characteristic of the medium of the external object, and
      perform a preset function based on the type of the external object.

2. The electronic device of claim 1, wherein the processor is further configured to perform a calibration of the electronic device based on the type of the external object.

3. The electronic device of claim 1, further comprising a communication module, wherein the processor is further configured to, based on the type of the external object, perform at least one of:

storing sensing data of the collision in the memory; and transmitting the sensing data of the collision to an external device through the communication module.

4. The electronic device of claim 1, further comprising a power management module, wherein the processor is further configured to, based on the falling pattern, perform at least one of:

driving a protection circuit included in the power management module;

stopping one or more functions of the processor; and backing up pre-stored data in the electronic device.

5. The electronic device of claim 1, further comprising a display device, wherein the processor is further configured to display information on the collision acquired based on at least one of the falling pattern, the collision pattern, and the type of the external object through the display device.

6. The electronic device of claim 1, wherein the at least one sensor includes at least one of an acceleration sensor, a gyro sensor, and a geo-magnetic sensor.

7. The electronic device of claim 1, wherein the at least one sensor includes an acceleration sensor, and the acceleration sensor has a measurement range less than or equal to 100 gravitational acceleration (G).

8. The electronic device of claim 1, wherein the processor is further configured to extract sensing data from a time point at which the falling starts to a time point before the electronic device performs a free fall as first section data and determine at least one of a falling direction of the electronic device, a cause of a falling motion, and an expected collision point of the electronic device based on the first section data.

9. The electronic device of claim 1, wherein the processor is further configured to extract sensing data from a time point at which the electronic device starts a free fall to a time point of the collision caused by the falling as second section data and determine a movement distance before the collision after the fall of electronic device based on the second section data.

10. The electronic device of claim 1, wherein the processor is further configured to extract sensing data from a time point of the collision caused by the falling to a time point at which a motion caused by the collision stops as third section data, and determine at least one of a contact time during which the electronic device contacts the external object due to the collision and a motion pattern after the collision based on the third section data.

11. An electronic device comprising:

at least one sensor configured to acquire sensing data; and a processor configured to:

acquire the sensing data corresponding to a falling of the electronic device through the at least one sensor, detect whether the electronic device collides with an external object based on the acquired sensing data, and when a collision is detected, determine a characteristic of a medium of the external object based on the acquired sensing data, determine a type of the external object based on the acquired sensing data and the characteristics of the medium of the external object, and perform a preset function according to the type of the external object.

12. The electronic device of claim 11, wherein the processor is further configured to perform a calibration of the electronic device based on the type of the external object.

13. The electronic device of claim 11, further comprising:

a memory; and a communication module, wherein the processor is further configured to, based on the type of the external object, perform at least one of:

storing the sensing data corresponding to the falling in the memory; and transmitting the sensing data corresponding to the falling to an external device through the communication module.

14. The electronic device of claim 11, further comprising a power management module, wherein the processor is further configured to, based on the acquired sensing data, perform at least one of:

driving a protection circuit included in the power management module;

stopping one or more functions of the processor; and backing up pre-stored data in the electronic device.

15. The electronic device of claim 11, further comprising a display device, wherein the processor is further configured to display information on the collision acquired based on at least one of the acquired sensing data and the type of the external object through the display device.

16. The electronic device of claim 11, wherein the at least one sensor includes at least one of an acceleration sensor, a gyro sensor, and a geo-magnetic sensor.

17. The electronic device of claim 11, wherein the at least one sensor includes an acceleration sensor, and the acceleration sensor has a measurement range less than or equal to 100 gravitational acceleration (G).

18. The electronic device of claim 11, wherein the processor is further configured to extract the sensing data from a time point at which the falling starts to a time point before the electronic device performs a free fall as first section data and determine at least one of a falling direction of the electronic device, a cause of a falling motion, and an expected collision point of the electronic device based on the first section data.

19. The electronic device of claim 11, wherein the processor is further configured to extract sensing data from a time point at which the electronic device starts a free fall to a time point of collision caused by the falling as second section data and determine a movement distance before the collision after the falling of the electronic device based on the second section data.

20. The electronic device of claim 11, wherein the processor is further configured to extract the sensing data from a time point of the collision caused by the falling to a time point at which a motion caused by the collision stops as third section data, and determine at least one of a contact time during which the electronic device contacts the external object due to the collision and a motion pattern after the collision based on the third section data.

* * * * *